(12) United States Patent
Otsuka

(10) Patent No.: US 6,298,016 B1
(45) Date of Patent: *Oct. 2, 2001

(54) RECORDING MEDIA INCLUDING AUXILIARY MEMORY OF DIFFERENT TYPES

(75) Inventor: Satoshi Otsuka, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,192

(22) Filed: May 18, 1999

(30) Foreign Application Priority Data

May 22, 1998 (JP) .................................... 10-141661

(51) Int. Cl.[7] ................ G11B 13/00; G11B 3/90
(52) U.S. Cl. ............... 369/14; 369/77.2; 369/53.41
(58) Field of Search ............... 369/14, 272, 273, 369/75.2, 75.1, 77.2, 77.1, 53.41, 53.45, 53.2; 360/133, 132

(56) References Cited

U.S. PATENT DOCUMENTS

| | | | |
|---|---|---|---|
| 4,338,644 | * | 7/1982 | Staar .................................. 360/132 |
| 4,814,924 | * | 3/1989 | Ozeki .................................. 360/133 |
| 4,839,875 | * | 6/1989 | Kuriyama et al. .................... 369/14 |
| 4,868,373 | * | 9/1989 | Opheij et al. ......................... 235/380 |
| 5,119,353 | * | 6/1992 | Asakura ............................... 369/13 |
| 5,235,586 | * | 8/1993 | Feamster et al. .................... 369/100 |
| 5,771,143 | * | 6/1998 | Vernois ................................ 360/133 |
| 5,822,145 | * | 10/1998 | Nishida et al. ...................... 360/133 |
| 5,940,363 | * | 8/1999 | Ro et al. ............................. 369/273 |
| 5,978,322 | * | 11/1999 | Sugimoto et al. .................... 369/14 |
| 6,044,046 | * | 3/2000 | Diezmann et al. ................... 369/14 |

* cited by examiner

Primary Examiner—Tan Dinh
(74) Attorney, Agent, or Firm—Sonnenschein, Nath & Rosenthal

(57) ABSTRACT

Promotion of effective use in accordance with different types of media, reduction in the load on users, and promotion of diversified use modes by use of media. A plurality of types of recording media (disk media, IC media, and hybrid media) are respectively almost the same in cartridge shape and any of them can be mounted in the recording media mounting part of a drive unit to enable recording or reproduction operations. The drive unit has a recording media mounting part in which the plurality of types of recording media can be respectively mounted, identifies the type of recording media mounted in the recording media mounting part in accordance with an identification feature formed on the cartridge of the recording media, and in accordance with the type of the identified recording media, performs a recording or reproduction operation on the mounted recording media by either or both of disk drive means and IC memory drive means.

15 Claims, 14 Drawing Sheets

FIG. 1

| [DISK MEDIA] DISK ONLY | ROM DISK | M11 |
|---|---|---|
| | RAM DISK | M12 |
| | P-ROM DISK | M13 |
| [IC MEDIA] IC MEMORY ONLY | ROM-IC | M21 |
| | RAM-IC | M22 |
| | ROM/RAM-IC | M23 |
| [HYBRID MEDIA] DISK AND IC MEMORY | ROM DISK + ROM-IC | M31 |
| | ROM DISK + RAM-IC | M32 |
| | ROM DISK + ROM/RAM-IC | M33 |
| | RAM DISK + ROM-IC | M34 |
| | RAM DISK + RAM-IC | M35 |
| | RAM DISK + ROM/RAM-IC | M36 |
| | P-ROM DISK + ROM-IC | M37 |
| | P-ROM DISK + RAM-IC | M38 |
| | P-ROM DISK + ROM/RAM-IC | M39 |

ROM DISK

AE
(ROM AREA)

RAM DISK

ARW
(REWRITABLE AREA)

PARTIAL ROM DISK

AE
ARW

ARW   AE

M21

M22, M23

DISK 91 : ROM DISK

IC MEMORY 92t : ROM-IC

DISK 91 : RAM DISK
   OR
   P-ROM DISK

IC MEMORY 92t : ROM-IC

DISK 91 : ROM DISK

IC MEMORY 92t : ROM-IC
   OR
   ROM/
   RAM-IC

DISK 91 : RAM DISK
   OR
   P-ROM DISK

IC MEMORY 92t : RAM-IC
   OR
   ROM/
   RAM-IC

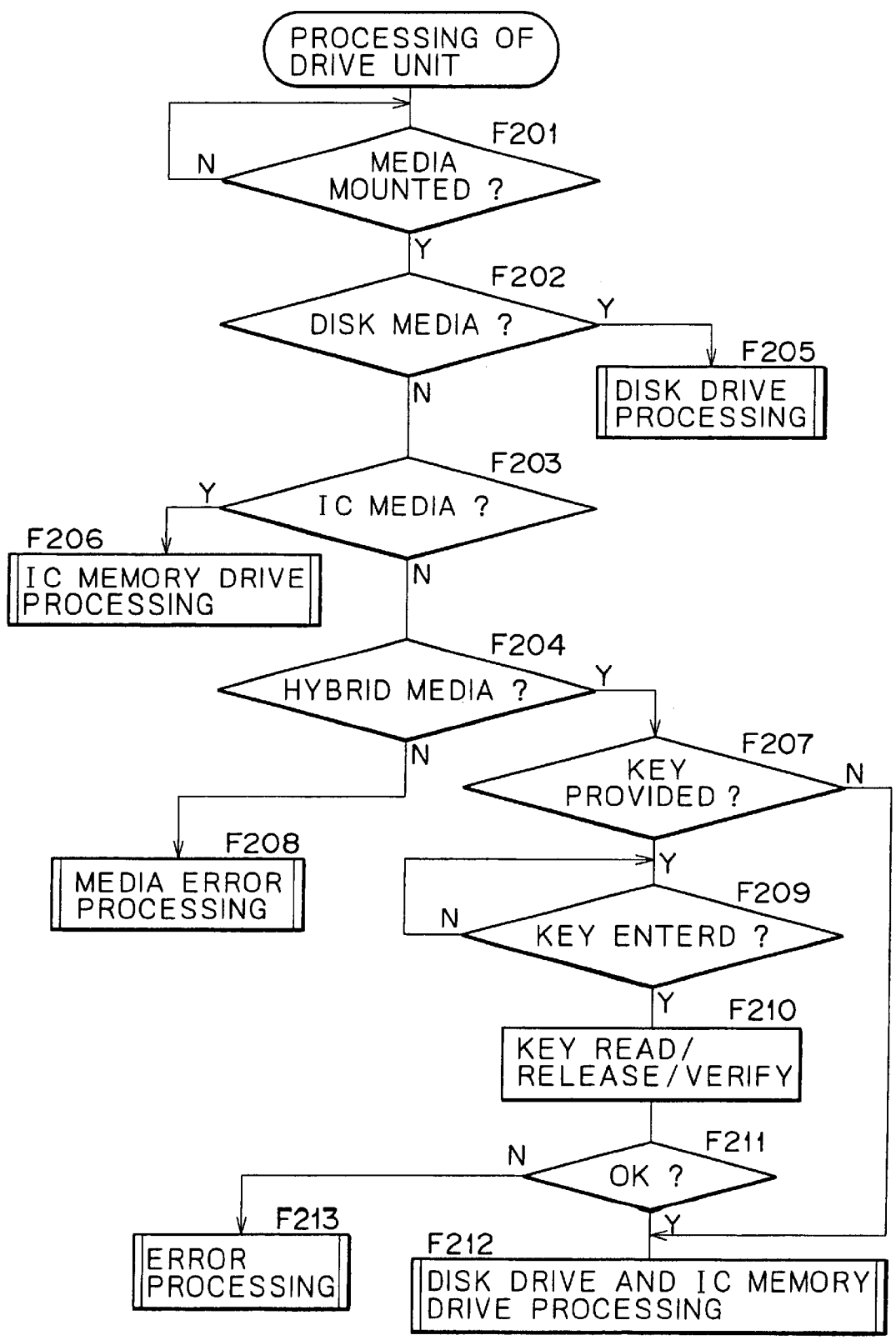

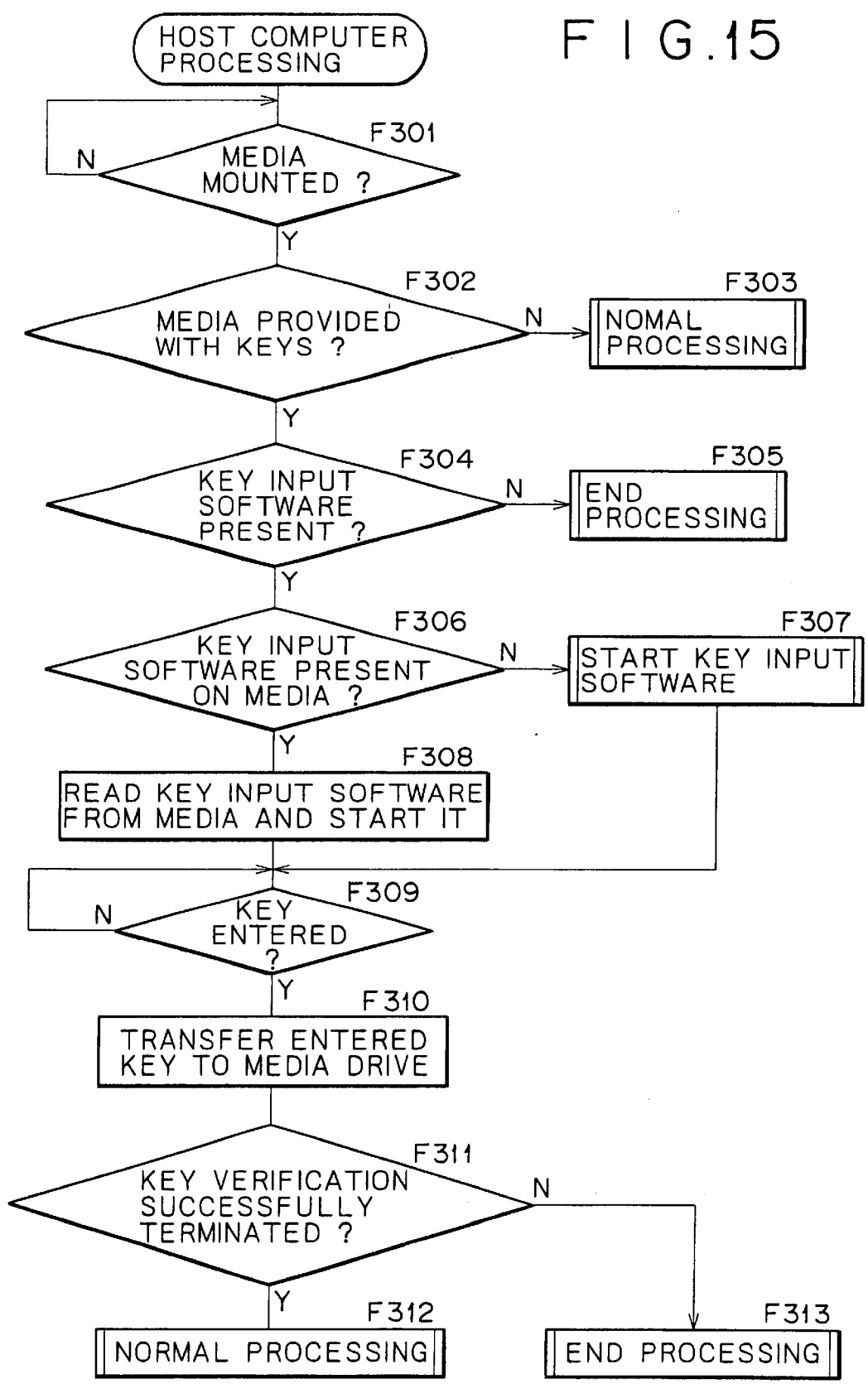

RECORDING MEDIA INCLUDING AUXILIARY MEMORY OF DIFFERENT TYPES

RELATED APPLICATION DATA

The present application claims priority to Japanese Application No. P10-141661 filed May 22, 1998, which application is incorporated herein by reference to the extent permitted by law.

BACKGROUND OF THE INVENTION

1. Field of the Invention

The present invention includes a drive unit that records and reproduces data in and from recording media, for example, in a computer system, a multimedia system, and a data communication system, and recording media in and from which data can be recorded and reproduced with the drive unit.

2. Description of the Prior Art

It is a general practice to distribute a variety of software and data using recording media such as optical disks, optical magnetic disks, magnetic disks, and IC cards. It also is a general practice for users to save data and the like in these recording media.

In these cases, usually, a disk drive that performs recording and reproduction operations on recording media such as optical disks and optical magnetic disks is connected to a host computer, and the disk drive writes and reads data to and from the disks under control of the host computer.

Recording media include the above described disk types and IC memory types and the like, which have characteristics, respectively.

For example, disk types have the advantage of being able to record relatively large volumes of data, whereas they are considerably slower than IC memories in recording/reproduction operation speed.

On the other hand, although IC memories have a smaller data recording capacity, the recording/reproduction operation speed is very high.

Since different types of media respectively have advantages and disadvantages as described above, users should select appropriate media and media drive units so as to meet their use modes.

However, practically, there are many cases where disk media and IC memory media should be used differently for different uses, in which case both a disk drive unit and an IC memory drive unit (IC card reader, etc.) must be provided. This raises the problem of providing users with increased equipment installation loads, to be more specific, purchase costs, installation spaces, and system connections changes.

In addition to widely used disk media such as a ROM disk used for reproduction only and a rewritable RAM disk, a partial ROM disk (hereinafter referred to as a P-ROM disk) with a part of a user area allocated as a ROM area and another part as a RAM (rewritable) area is also being developed. The P-ROM disk permits more diversified and prospective use modes than the ROM and RAM disks.

However, a P-ROM disk has a drawback in that the manufacturing yield is relatively bad, and this fact hampers the widespread use of the P-ROM disk and the promotion of diversified use modes thereof.

SUMMARY OF THE INVENTION

With such a problem in view, the present invention has been made and words towards promoting effective use of various media in accordance with characteristics thereof, relieve users of burdens, and promote diversified use modes by use of media.

To achieve the above, the respective cartridges of a plurality of types of recording media, each having a cartridge as a housing, are shaped so that the recording media mounting part of a drive unit capable of recording or reproduction operations on the plurality of types of recording media can be shared between one of the plurality of types of recording media and others of them.

That is, the plurality of types of recording media referred to herein are respectively almost the same in cartridge shape and any of them can be mounted in the recording media mounting part of the drive unit.

The plurality of types of recording media, for example, include recording media (disk media) with disk-shape recording media housed within a cartridge, recording media (IC media) with IC memory housed within a cartridge, and recording media (hybrid media) with disk-shape recording media and IC memory housed within a cartridge.

On each cartridge is formed an identification feature for providing identification of a type thereof.

On the other hand, a drive unit that can perform recording or reproduction operations on a plurality of types of these recording media comprises: a recording media mounting part in which the plurality of types of recording media can be respectively mounted; identification means for identifying the type of the recording media in accordance with an identification feature formed on the cartridge of recording media mounted in the recording media mounting part; disk drive means for performing a recording or reproduction operation on disk-shape recording media; IC memory drive means for performing a recording or reproduction operation on disk-shape recording media; and control means, in accordance with the type of recording media identified by the identification means, for controlling a recording or reproduction operation on the mounted recording media by either or both of the disk drive means and the IC memory drive means. That is, the drive unit can provide for any of disk media, IC media, and hybrid media mounted.

Diversified use modes are provided for hybrid media.

As recording media of the present invention, in part or the whole of an area, of the recording media, in or from which data can be recorded or reproduced, one or more data protection areas are allocated and one or more pieces of key data corresponding to the data protection areas are recorded.

A drive unit according to the present invention comprises: key data existence judgement means for judging whether key data is recorded in mounted recording media; and drive permission means for matching the key data with input data when it is determined by the key data existence judgement means that the mounted media are recording media in which key data is recorded, and when the matching yields a successful result, for permitting a recording or reproduction operation on a data protection area on the recording media, corresponding to the key data.

In other words, data protection areas in or from which data can be recorded or reproduced only when matching by use of key data is OK can be allocated, thereby promoting diversified use modes and media/data distribution modes.

BRIEF DESCRIPTION OF THE DRAWINGS

FIG. 1 is a diagram for explaining media types embodied by the present invention.

FIG. 14 is a flowchart for the operation of a drive unit embodied by the present invention, including processing corresponding to key data.

FIG. 15 is a flowchart for the operation of a host computer connected to a drive unit embodied by the present invention, including processing corresponding to key data.

DESCRIPTION OF THE PREFERRED EMBODIMENTS

Figure 2A:
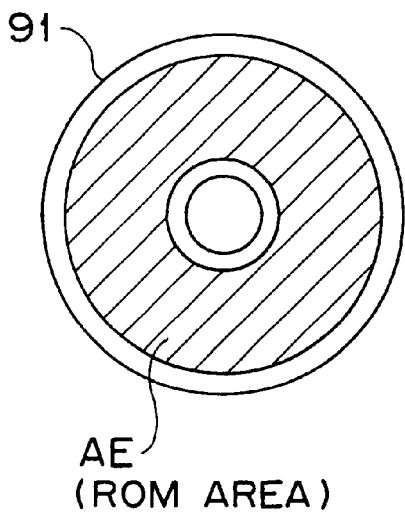
FIGS. 2A to 2D are diagrams for explaining the area layouts of disk embodied by the present invention.

Hereinafter, a description will be made of different types of media embodied by the present invention and a drive unit.

1. Media type
2. Types of disks as media
3. Types of IC memories as media
4. Cartridge shapes of various media
5. Characteristics of various media
6. Configuration of drive unit
7. Operation of drive unit
8. Media in which key data is recorded
9. Drive operations on media in which key data is recorded 1. Media Types Recording media embodied have a plurality of types, which will be described below.

Media in this example are primarily classified into three types, as shown in FIG. 1: disk media, IC media, and hybrid media.

The configurations of the media will be described in FIG. 5 and following figures, and the media are housed within a cartridge of similar shape.

The disk media type includes optical disks housed within a cartridge. The IC media type includes IC memories housed within a cartridge. The hybrid media type refers to a hybrid of optical disk and IC memory housed within a cartridge.

In disk media or hybrid media, optical disks housed within a cartridge include ROM, RAM, and P-ROM disks.

In IC media or hybrid media, IC memories housed within a cartridge include ROM-IC, RAM-IC, and ROM/RAM-IC.

Accordingly, media in this example are finely classified into 15 types as shown in FIG. 1.

For convenience of description, the fifteen types of media listed in FIG. 1 are marked with symbols M11 to M39, as shown on the right thereof. In following descriptions, specific media of the fifteen types will be described using the symbols. For example, "media M11" would refer to disk media housing a ROM disk.

2. Types of Disks as Media

The respective area layouts of ROM disk, RAM disk, and P-ROM disk of the disk media or hybrid media type, classified as optical disks housed within a cartridge, will be described with reference to FIGS. 2 and 3.

Figure 2B:
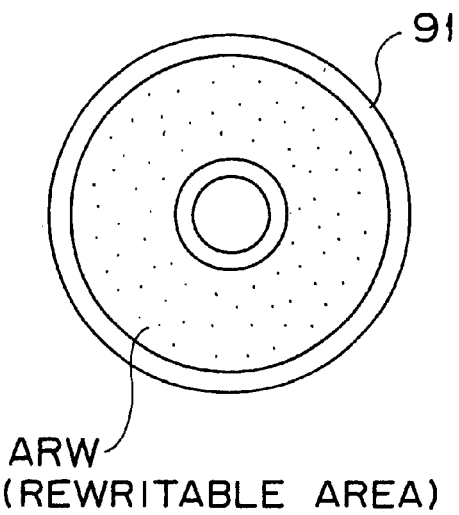

FIGS. 2A to 2D show different types of disks 91. FIG. 2A shows a ROM disk in which the entire main data area is a reproduction-only area (ROM area) AE produced by e.g., embossed pits. FIG. 2B shows a RAM disk in which the entire main data area is a recordable/reproducible rewritable area ARW comprised of e.g., an optical magnetic area.

Figure 2C:
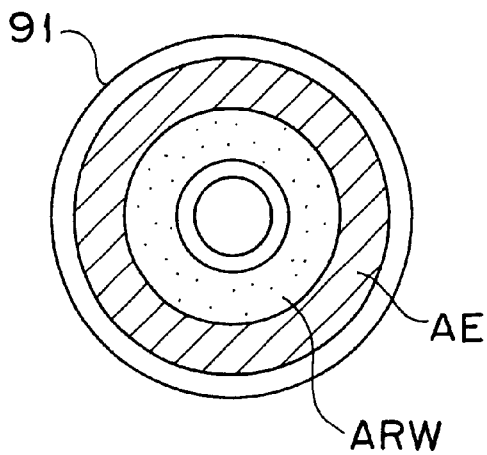
Figure 2D:
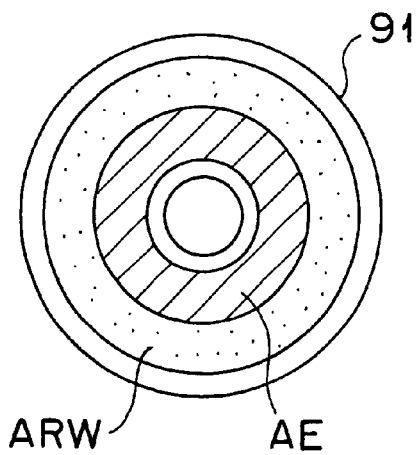

A partial ROM disk has a structure shown in FIG. 2C or 2D, for example. That is, in a main data area on one disk are allocated a ROM area AE and a rewritable area ARW.

Figure 3:
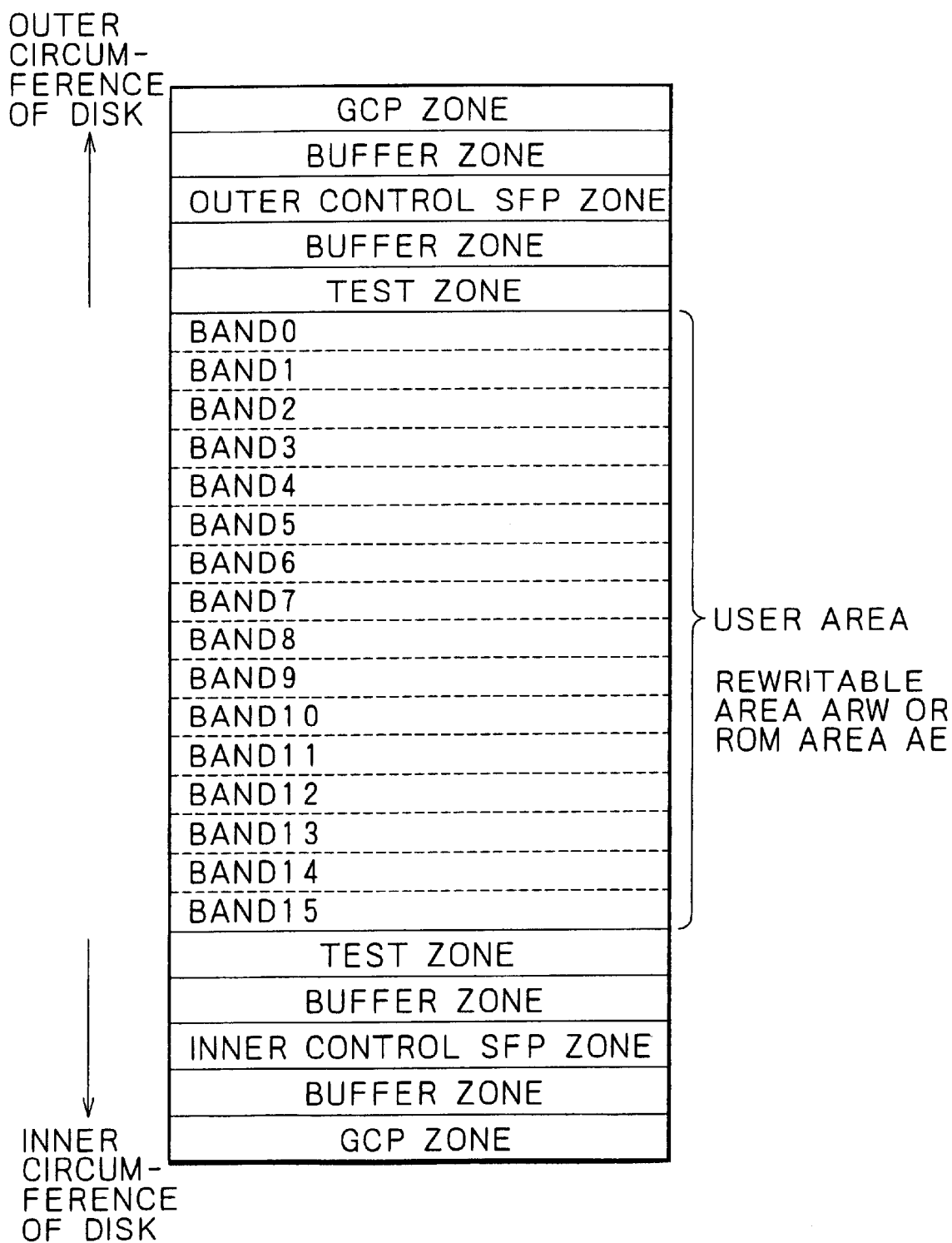
FIG. 3 is a diagram for explaining a user area of disk embodied by the present invention.

FIG. 3 is common to the disks 91 of FIGS. 2A to 2D. It shows an area layout from the outer circumferences to the inner circumferences of a disk. In the outermost circumference of the disk is allocated a GCP (Gray Code Part) zone of 736 tracks, and toward the innermost circumference are allocated a buffer zone of 2 tracks, an outer control SFP zone of 5 tracks, a buffer zone of 2 tracks, and a test zone of 5 tracks.

The test zone is followed by a user area used as a main data area, which consists of a rewritable area ARW to which users can record data, and a ROM area AE used for only reproduction. The user area is split into 16 bands, bands 0 to 16.

In the ROM disk of FIG. 2A, the entire user area is a ROM area AE in which data is recorded by embossed pits.

In the RAM disk of FIG. 2B, the entire user area is a rewritable area ARW.

In the partial ROM disks of FIGS. 2C and 2D, part of bands 0 to 15 constitutes a ROM area AE and another part constitutes a rewritable area ARW.

Which of the 16 bands is to be used as a rewritable area ARW and the other as a ROM area AE can be freely set by a manufacturer.

Toward the inner circumferences from the user area are allocated a test zone of five tracks, a buffer zone of two tracks, an inner control SFP zone of five tracks, a buffer zone of two tracks, and a GCP zone of 820 tracks.

The GCP zone, outer control SFP zone, and inner control SFP zone are areas in which predetermined control information is recorded, respectively.

For example, there are recorded physical information (MO/ROM, etc.) of media, media type (indicating ROM media all produced by embossed pits, RAM media by all formed by MO areas, partial ROM media, etc.), format descriptor, start track number of SFP zone, maximum read power, clock ratio in control track, later wavelength, reflection factor, track pitch, maximum track number, maximum block address, start physical block address of DDS (Disc Definition Sector), number of tracks of test zone, number of bytes of user area, control information of bands (bands 0 to 15) formed in groups of 16 in the case of partial ROM disks and ROM disks, and other information.

Furthermore, as detailed information about each of bands (bands 0 to 15) formed in groups of 16, there are recorded a start track address of each band, the total number of tracks, the total number of sectors, the number of sectors as a user area, the number of parity sectors, the number of preceding and following buffer sectors, the number of segments of sector, clock ratio, and other information.

This disk is a so-called zone CAV disk that is constant in disk rotation speed and in which a recording/reproducing clock is variable for each zone; 16 bands, bands 0 to 15, in a user area are zones corresponding to specific recording/reproducing clocks, respectively.

3. Types of IC Memories as Media

The respective area layouts of ROM-IC, RAM-IC, and ROM/RAM-IC of the IC media or hybrid media type, classified as IC memories housed within a cartridge, will be described with reference to FIG. 4.

Figure 4A:
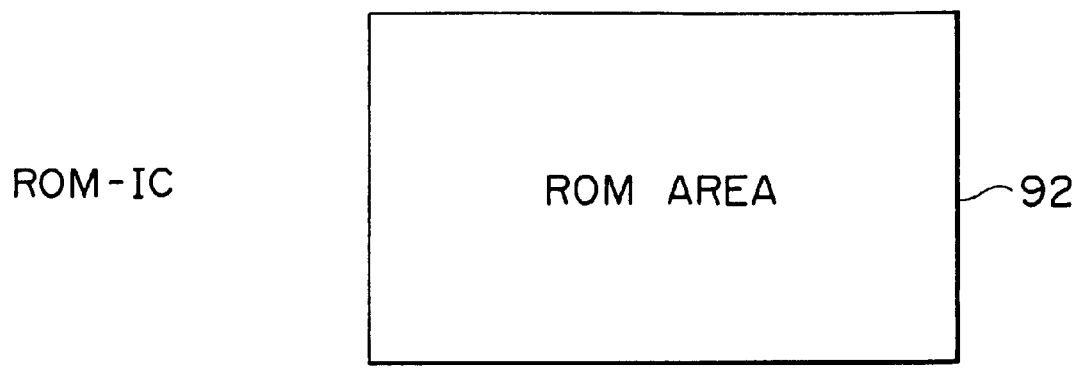
FIGS. 4A to 4C are diagrams for explaining the area layouts of IC memory embodied by the present invention.
Figure 4B:
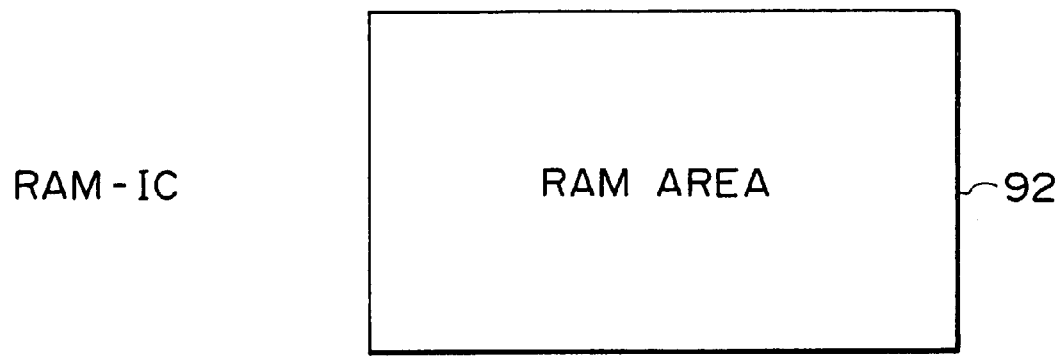
Figure 4C:
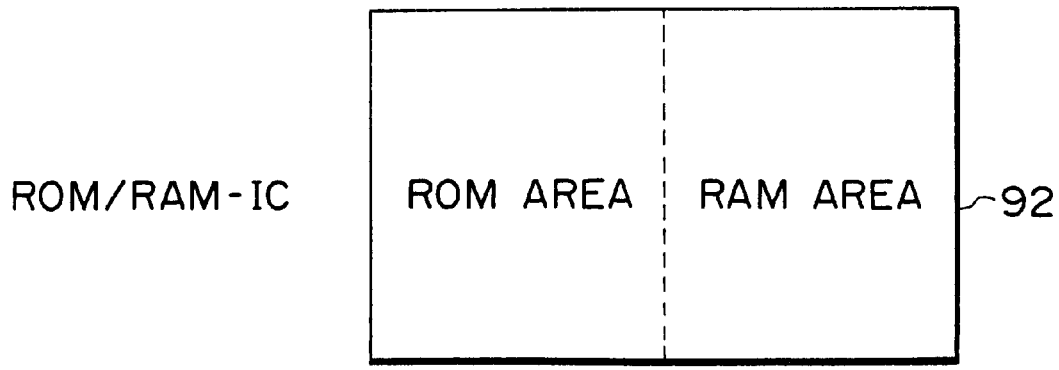

FIGS. 4A to 4C show different types of IC memories 92. FIG. 4A shows ROM-IC in which the entire data area is a reproduction-only area (ROM area). FIG. 4B shows RAM-IC in which the entire data area is, for example, a writable/readable RAM area.

FIG. 4C shows the structure of ROM/RAM-IC in which both a ROM area and a RAM area are allocated as a data area.

ROM-IC, RAM-IC, and ROM/RAM-IC having these storage area layouts are installed in IC media.

Although only a data storage area is shown herein, in reality, within a cartridge as IC media is installed also a controller (CPU) that controls access to data storage areas, data read and write, interfaces with drive units, and other operations.

4. Cartridge Shapes of Various Media

Referring now to FIGS. 5 to 10, for each of disk media, IC media, and hybrid media, a description will be made of a cartridge shape and a media identification feature.

Figure 5A:
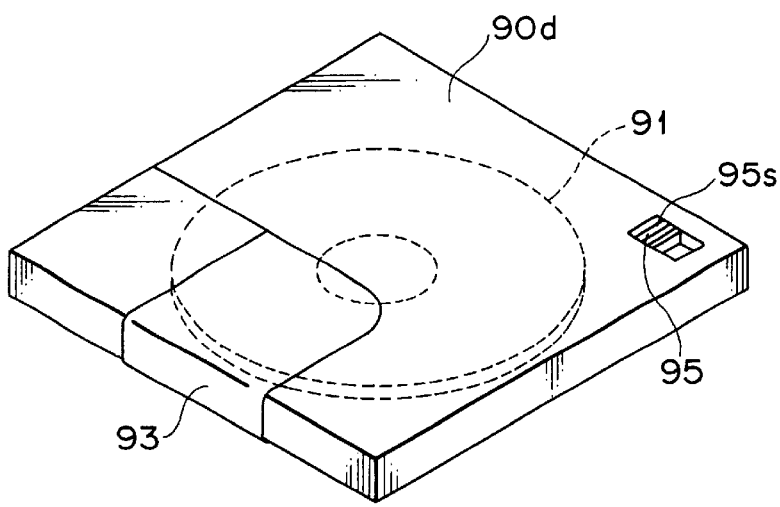
FIGS. 5A and 5B are diagrams for explaining disk media embodied by the present invention.

FIG. 5A shows an example of the configuration of disk media.

For disk media, a disk 91, which is rotatably housed within a cartridge 90d, is exposed and becomes ready for a recording/reproducing operation when a shutter 93 is opened. That is, when the cartridge 90d is mounted in a drive unit described later, although not shown, a center plate of the disk 91 exposed to the lower surface of the cartridge is chucked, the disk 91 is rotatably driven by a spindle motor of the drive unit, the shutter 93 is opened, and a write/read operation on a disk recording surface by the recording/reproducing head is enabled.

For such disk media, a write protection switch (hereinafter called a WP switch) 95 is provided in a specific position of the cartridge 90d. The WP switch 95 causes write protection state when a user switches slide part 95s to a protection position. That is, the drive unit recognizes that the disk is write protected. For explanation purposes, the slide part 95s shown in FIG. 5 is set to a normal position (non-protection position).

The WP switch 95 is provided for cartridges in which a disk 91 housed is a RAM disk or P-ROM disk (media M12, M13).

Figure 5B:
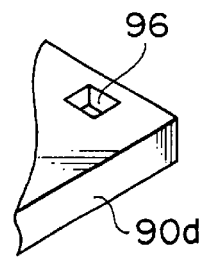

When the disk 91 housed is a ROM disk (media M11), the WP switch 95 is not provided, and a detection hole 96 is formed on the cartridge 90d in almost the same position as that of the WP switch 95, as shown in FIG. 5B.

The detection hole 96 is, for example, formed in a position corresponding to the normal position (non-protection position) in the slide part 95s of the WP switch 95.

Figure 6A:
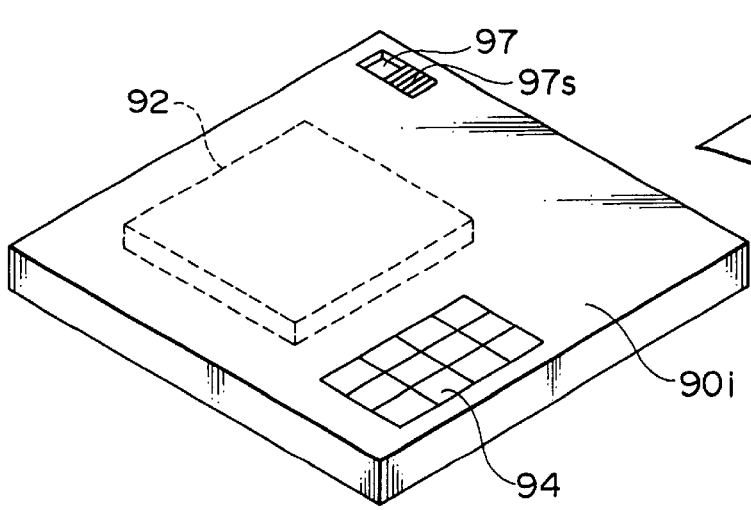
FIGS. 6A and 6B are diagrams for explaining IC media embodied by the present invention.

FIG. 6A shows an example of the configuration of IC media.

For IC media, an IC memory 92 is housed within a cartridge 90i, and as an electrical contact with a drive unit for writing and reading data to and from the IC memory 92, a contact 94 is formed in a predetermined position of the cartridge 90i.

That is, when the cartridge 90i is mounted in a drive unit described later, the contact 94 comes into contact with a contact terminal of the drive unit so that access to the IC memory 92 from the drive unit becomes possible.

For such IC media, a WP switch 97 is provided in a specific position of the cartridge 90i. The specific position in this case is different from the position of the WP switch 95 in the cartridge 90d provided for the disk media.

The WP switch 97, like the above WP switch 95, causes write protection state when a user switches a slide part 97s to a protection position. That is, the drive unit recognizes that the IC memory is write protected.

The slide part 97s shown in FIG. 6A is set to a normal position (non-protection position).

The WP switch 97 is provided for cartridges in which an IC memory 92 housed is a RAM-IC or ROM/RAM-IC (media M22, M23).

Figure 6B:
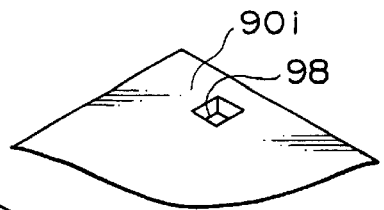

When the IC memory 92 housed is a ROM-IC (media M21), the WP switch 97 is not provided, and a detection hole 98 is formed on the cartridge 90i in almost the same position as that of the WP switch 97, as shown in FIG. 6B. The detection hole 98 is, for example, formed in a position corresponding to the normal position (non-protection position) in the slide part 97s of the WP switch 97.

Figure 7A:
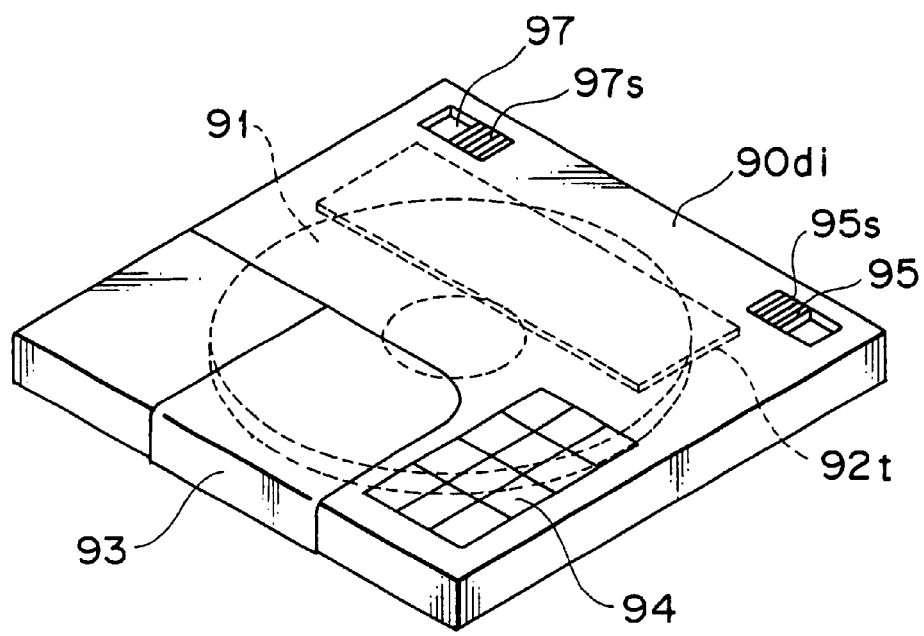
FIGS. 7A to 7C are diagrams for explaining hybrid media embodied by the present invention.

FIG. 7A shows an example of the configuration of hybrid media.

For hybrid media, a disk 91, which is rotatably housed within a cartridge 90di, is exposed and becomes ready for a recording/reproducing operation when a shutter 93 is opened. That is, the hybrid media are the same as the above disk media in this sense.

Furthermore, an IC memory 92t is housed within the cartridge 90di, and as an electrical contact with a drive unit for writing and reading data to and from the IC memory 92t, a contact 94 is formed in a predetermined position of the cartridge 90i. The position and shape of this contact 94 are the same as those of the contact 94 of the above IC media. Accordingly, also in the case of the hybrid media, when the cartridge 90di is mounted in a drive unit described later, the contact 94 comes into contact with a contact terminal of the drive unit so that access to the IC memory 92t from the drive unit becomes possible.

For the hybrid media, a thin-type IC memory 92t is adopted. That is, since an IC memory in addition to the disk 91 is housed, a thin-type IC memory 92t is used. However, other than a thin-type IC memory may also be used if it can be housed.

For such hybrid media, the WP switch 95 is provided in a specific position (the same position as that of the WP switch 95 of the above disk media) of the cartridge 90di. The WP switch 95 is used to provide write protection for the disk 91, and when a user switches the slide part 95s to a protection position, the disk 91 is write protected. That is, the drive unit recognizes that the disk 91 is write protected.

Furthermore, with the hybrid media, the WP switch 97 is provided in a specific position (the same position as that of the WP switch 97 of the above IC media) of the cartridge 90di. The WP switch 97 is used to provide write protection for the IC memory 92t, and when a user switches the slide part 97s to a protection position, the IC memory 92t is write protected. That is, the drive unit recognizes that the IC memory 92t is write protected.

The WP switch 95 is provided for cartridges in which a disk 91 housed is a RAM disk or P-ROM disk (media M34, M35, M36, M37, M38, M39).

Figure 7B:
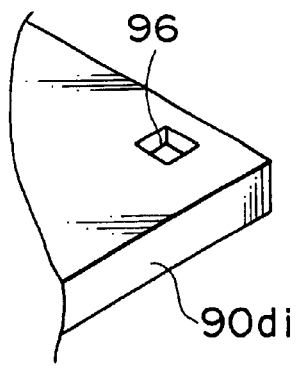

When the disk 91 housed is a ROM disk (media M31, M32, M33), the WP switch 95 is not provided, and a detection hole 96 is formed on the cartridge 90di in almost the same position as that of the WP switch 95, as shown in FIG. 7B. The detection hole 96 is, for example, formed in a position corresponding to the normal position (non-protection position) in the slide part 95s of the WP switch 95.

The WP switch 97 is provided for cartridges in which an IC memory 92t housed is a RAM-IC or ROM/RAM-IC (media M32, M33, M35, M36, M38, M39)

When the IC memory 92t housed is a ROM-IC (media M31, M34, M37), the WP switch 97 is not provided, and a detection hole 98 is formed on the cartridge 90di in almost the same position as that of the WP switch 97, as shown in FIG. 7D. The detection hole 98 is, for example, formed in a position corresponding to the normal position (non-protection position) in the slide part 97s of the WP switch 97.

Figure 7C:
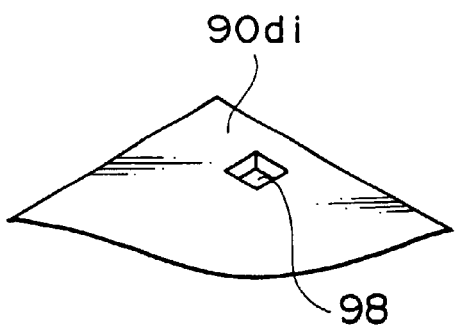

Examples of the shapes of different types of media have been shown in FIGS. 5, 6, and 7. As seen from these figures, the cartridges of the media are similar in shape and identical in external size. Accordingly, the different types of media can be supported by simply providing one media mounting feature for a drive unit.

By matching the cartridge shape/size to that of conventional cartridges, the disk media of FIG. 5 and the hybrid media of FIG. 7 can also be used for recording and reproduction by disk drive units supporting the conventional cartridge disks (only for the disk 91 in the case of the hybrid media).

By the way, since a media mounting feature can be shared as described above, a drive unit requires a feature that can identify the types of mounted media.

This example shows a drive unit that can identify the types of media using the WP switches 95 and 97 and the detection holes 96 and 98.

A variety of shapes and identification methods are possible with the identification feature, without being limited to the example described below.

A description will be made of a positional relationship among the WP switches 95 and 97 and the detection holes 96 and 98 on the cartridge 90 (90d, 90i, 90di).

Figure 8A:
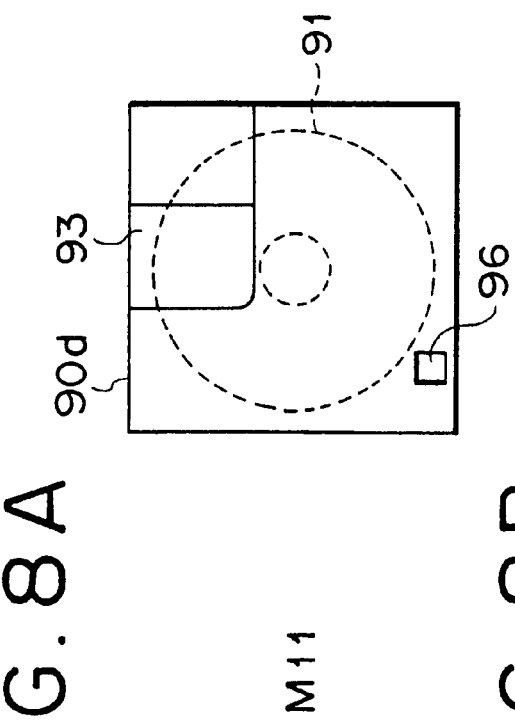
FIGS. 8A and 8B are diagrams for explaining the identification features of disk media embodied by the present invention.
Figure 8B:
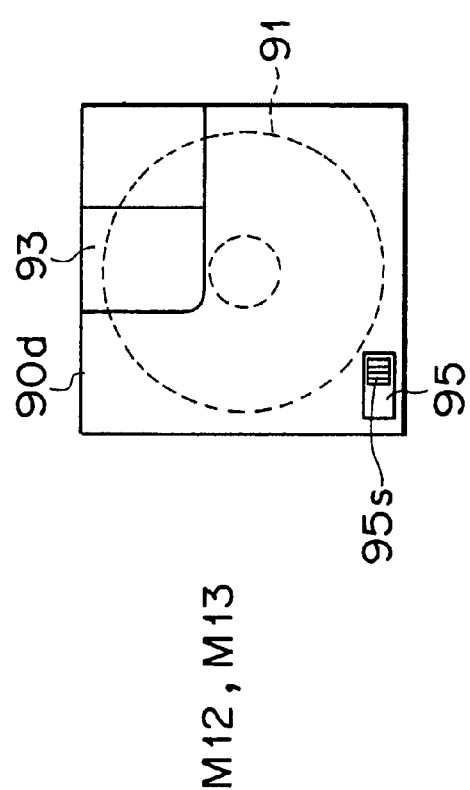

FIGS. 8A and 8B show a cartridge 90d of disk media. FIG. 8A shows media M11 that a disk 91 is a ROM disk, and FIG. 8B shows media M12 and M13 that a disk 91 is a RAM disk or P-ROM disk. As described above, in media M11 of FIG. 8A, a detection hole 96 is formed in a specific position (a lower left position of the cartridge 90d in FIG. 8: hereinafter simply called a lower left position) of the cartridge 90d. In media M12 or M13 of FIG. 8B, similarly, a WP switch 95 is formed in the lower left position.

FIG. 8B shows the WP switch 95 whose slide part 95s is in a normal position (position recognized as recordable= non-protection position).

Namely, the slide part is positioned so that it blocks a position corresponding to the detection hole 96 of FIG. 8A.

On the other hand, although not shown in the figure, when the slide part 95s is slid to the left in the figure, the WP switch 95 of FIG. 8B goes into the state in which a position corresponding to the detection hole 96 of FIG. 8A is opened. That is, this is the state in which a hole is formed in the same position on the cartridge 90d of FIG. 8A.

Figure 9A:
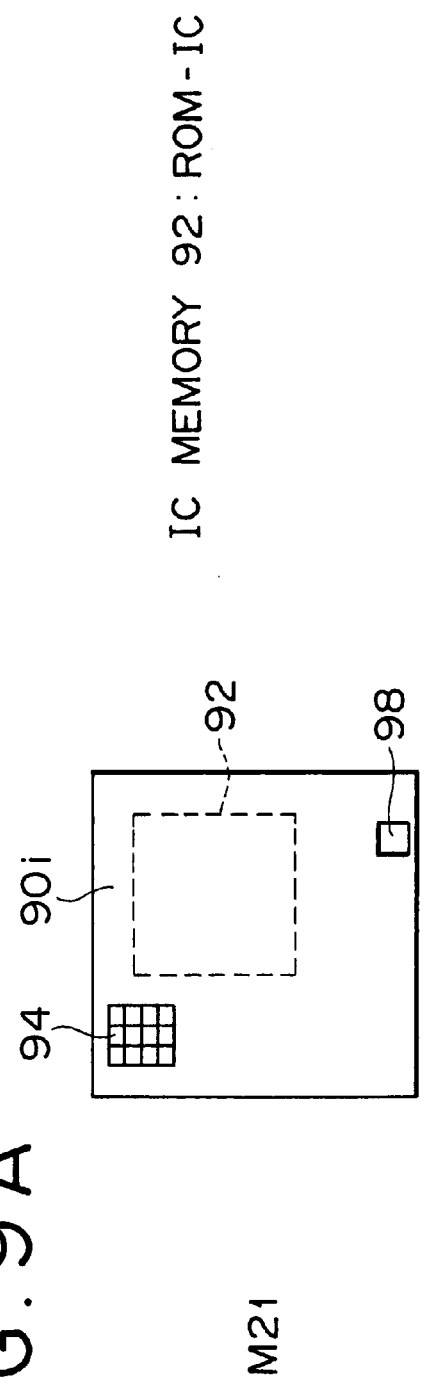
FIGS. 9A to 9B are diagrams for explaining the identification features of IC media embodied by the present invention.
Figure 9B:
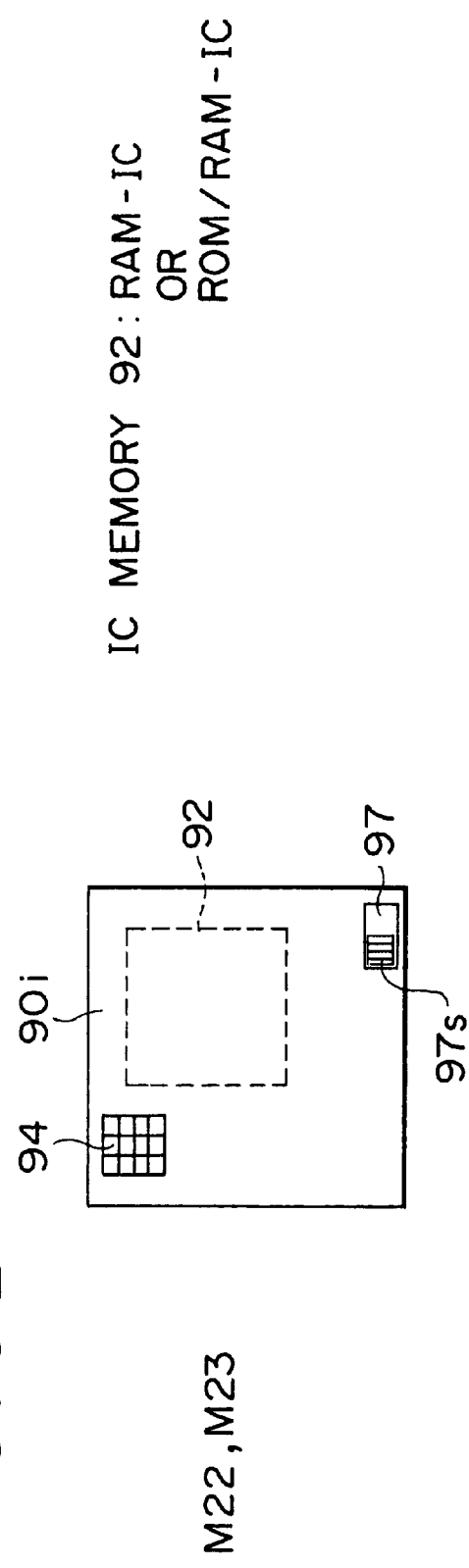

FIGS. 9A and 9B show a cartridge 90i of IC media. FIG. 9A shows media M21 that an IC memory 92 is a ROM-IC, and FIG. 9B shows media M22 and M23 that an IC memory 92 is a RAM-IC or ROM/RAM-IC. In media M21 of FIG. 9A, a detection hole 98 is formed in a specific position (a lower right position of the cartridge 90i in FIG. 9: hereinafter simply called a lower right position) of the cartridge 90i. In media M22 or M23 of FIG. 9B, similarly, a WP switch 97 is formed in the lower right position.

FIG. 9B shows the WP switch 97 whose slide part 97s is in a normal position (position recognized as recordable= non-protection position).

Namely, the slide part 97s is positioned so that it blocks a position corresponding to the detection hole 98 of FIG. 9A.

On the other hand, although not shown in the figure, when the slide part is slid to the right in the figure, the WP switch 95 of FIG. 9B goes into the state in which a position corresponding to the detection hole 98 of FIG. 9A is opened. That is, this is the state in which a hole is formed in the same position on the cartridge 90i of FIG. 9A.

Figure 10A:
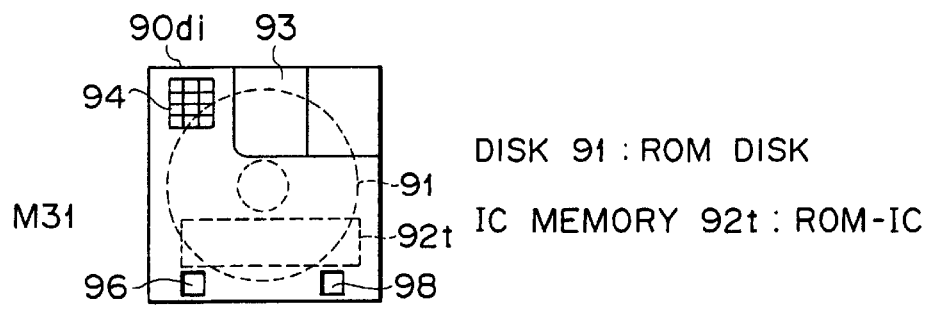
FIGS. 10A to 10D are diagrams for explaining the identification features of hybrid media embodied by the present invention.
Figure 10B:
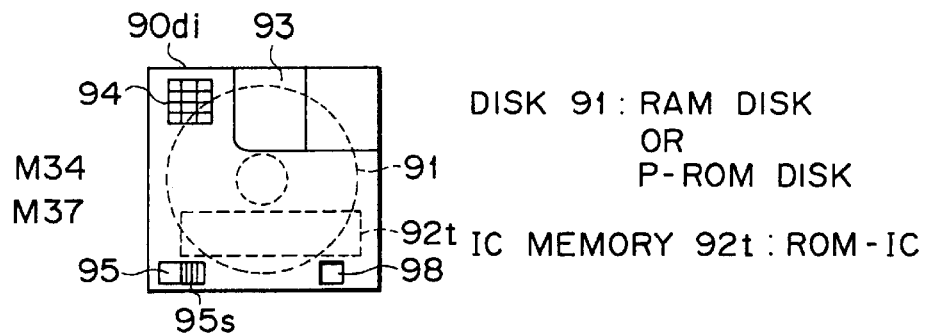

FIGS. 10A to 10D show a cartridge 90di of hybrid media. FIGS. 10A shows media M31 that a disk 91 is a ROM disk and an IC memory 92t is a ROM-IC. FIG. 10B shows media M34 and M37 that the disk 91 is a RAM disk or P-ROM disk, and the IC memory 92t is a ROM-IC.

Figure 10C:
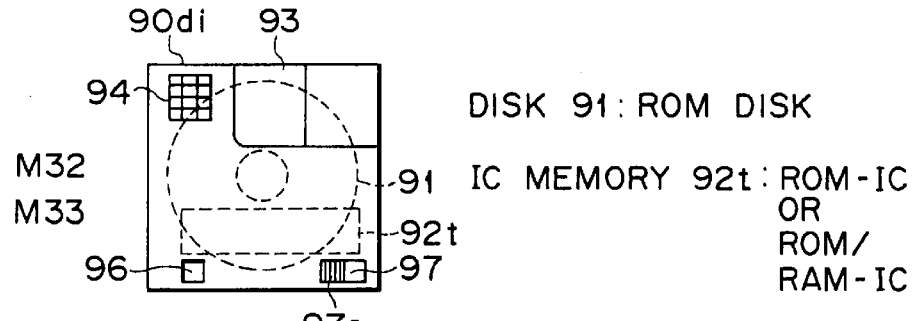
Figure 10D:
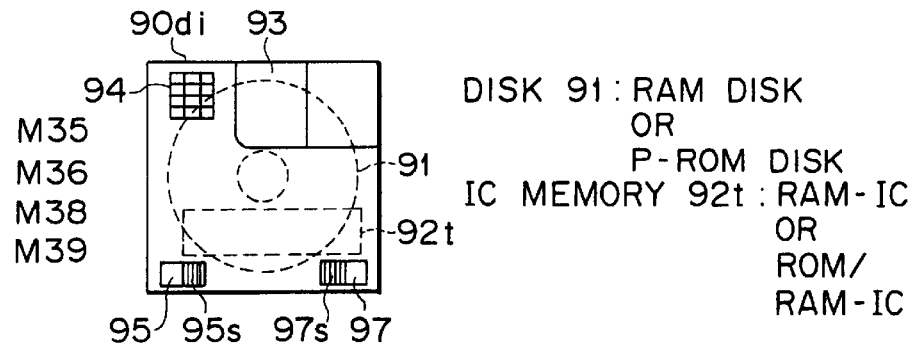

FIG. 10C shows media 32 and M33 that the disk 91 is a ROM disk and the IC memory 92t is a RAM-IC or ROM/RAM-IC. FIG. 10D shows media M35, M36, M38, and M39 that the disk 91 is a RAM disk or P-ROM disk, and the IC memory 92t is a RAM-IC or ROM/RAM-IC.

For the hybrid media, the WP switch 95 or detection hole 96 having the same feature as that in the above disk media is formed in a lower left position of the cartridge, like the above disk media, and furthermore, the WP switch 97 or detection hole 98 having the same feature as that in the above IC media is formed in a lower right position, like the above IC media.

Media are identified as described below by the WP switches 95 and 97 and the detection holes 96 and 98 formed with such a positional relationship.

The drive unit, by an optical means or mechanical switch means, identifies media in accordance with ① through ⑧ described below by determining a structure and hole shape in the lower left position and the lower right position of the cartridge.

① When a hole exists in a position corresponding to the detection hole 96 in a lower left position of the cartridge 90 (including when the slide part 95s of the WP switch 95 is in a write protection position) and the existence of the detection hole 98 or WP switch 97 is not recognized in a lower right position The case where the existence of the detection hole 98 or WP switch 97 is not recognized refers to the case where a hole does not exist (not detected) in positions (that is, including a position corresponding to the detection hole 98) corresponding to the slide range of the WP switch 97.

In the case of ①, it can be determined that the media are the disk media M11, or disk media M12 or M13 and are write protected. That is, it can be determined that the media are reproduction-only disk media.

② When no hole exists in a position corresponding to the detection hole 96 in a lower left position of the cartridge 90 (the slide part 95s of the WP switch 95 is in a normal position (non-protection position)) and the existence of the detection hole 98 or WP switch 97 is not recognized in a lower right position In this case, it can be determined that the media are disk media M12 or M13, that is, write-enabled disk media.

③ When the existence of the detection hole 96 or WP switch 95 is not recognized in a lower left position of the cartridge 90 and a hole exists in a position corresponding to the detection hole 98 in a lower right position (including when the slide part 97s of the WP switch 97 is in a write protection position)

The case where the existence of the detection hole 96 or WP switch 95 is not recognized refers to the case where a hole does not exist (not detected) in positions (that is, including a position corresponding to the detection hole 96) corresponding to the slide range of the WP switch 95.

In the case of ③, it can be determined that the media are the IC media M21, or IC media M22 or M23 and are write protected. That is, it can be determined that the media are reproduction-only IC media.

④ When the existence of the detection hole 96 or WP switch 95 is not recognized in a lower left position of the cartridge 90 and a hole does not exist in a position corresponding to the detection hole 98 in a lower right position (when the slide part 97s of the WP switch 97 is in a normal position) In this case, it can be determined that the media are IC media M22 or M23, that is, write-enabled IC media.

⑤ When a hole exists in a position corresponding to the detection hole 96 in a lower left position of the cartridge 90 (including when the WP switch 95 is in a write protection position) and a hole exists in a position corresponding to the detection hole 98 in a lower right position (including when the WP switch 97 is in a write protection position)

In this case, it can be determined that the media are one of hybrid media M31 to M39 and are hybrid media having a reproduction-only disk and a reproduction-only IC memory.

⑥ When no hole exists in a position corresponding to the detection hole 96 in a lower left position of the cartridge 90 (the WP switch 95 is in a normal position) and a hole exists in a position corresponding to the detection hole 98 in a lower right position (including when the WP switch 97 is in a write protection position)

In this case, it can be determined that the media are one of hybrid media M34, M35, M36, M37, M38, and M39 and are hybrid media having a write-enabled disk and a reproduction-only IC memory.

⑦ When a hole exists in a position corresponding to the detection hole 96 in a lower left position of the cartridge 90 (including when the WP switch 95 is in a write protection position) and no hole exists in a position corresponding to the detection hole 98 in a lower right position (the WP switch 97 is in a normal position)

In this case, it can be determined that the media are one of hybrid media M32, M33, M35, M36, M38, and M39 and are hybrid media having a reproduction-only disk and a write-enabled IC memory.

⑧ When no hole exists in a position corresponding to the detection hole 96 in a lower left position of the cartridge 90 (the WP switch 95 is in a normal position) and no hole exists in a position corresponding to the detection hole 98 in a lower right position (the WP switch 97 is in a normal position)

In this case, it can be determined that the media are one of hybrid media M35, M36, M38, and M39 and are hybrid media having a write-enabled disk and a write-enabled IC memory.

As described above, by making the determinations of ① to ⑧, the drive unit can distinguish among disk media, IC media, and hybrid media, and determine whether the disk 91 or IC memory 92 is write enabled or used only for reproduction, respectively, and can thereby perform processing suitable for mounted media.

5. Characteristics of Various Media

Next, a description will be made of advantages brought about by availability of each of the media M11 to M39 shown in FIG. 1.

By using the media in different ways for different uses, the user can obtain advantages specific to the media used and enjoy effects brought about by the advantages of the media. Hereinafter, examples of advantages and media having the advantages will be described.

Examples of advantages to be described include mass storage, fast write/read, compatibility with conventional disk drive units, ease of manufacturing, and diversity of use method.

[Mass storage]

Media having the disk 91 can afford the advantage of being capable of storing mass data. That is, this type of media includes disk media (M11 to M13) and hybrid media (M31 to M39).

[Fast write/read]

Media having the IC memory 92 can afford the advantage of permitting fast access (write/read). That is, this type of media includes IC media (M21 to M23) and hybrid media (M31 to M39).

[Compatibility with conventional disk drive units]

By shaping the cartridge 90 to match disk media of conventional disk drive units and matching data formats recorded in the disk 91 to conventional ones, media having the disk 91 permit recording or reproduction by conventional disk drive units. That is, this type of media includes disk media (M11 to M13) and hybrid media (M31 to M39).

[Ease of manufacturing]

Although P-ROM disks have difficulty in the improvement of manufacturing yields, media not having PROM disks are free from such a difficulty. That is, disk media M11 and M12, IC media M21 and M22, and hybrid media M31 to M36 have no difficulty with manufacturing.

P-ROM disks have both a ROM area and a rewritable area and thereby provide diversified use modes as described below. Media having both a ROM area and a rewritable area (RAM area), without using a P-ROM disk, include IC media M23, hybrid media M32, M33, M34, and M36, which have not so great difficulty with manufacturing. In other words, media that provide the same usability as P-ROM disks without using P-ROM disks can be inexpensively manufactured and sold.

[Diversified use modes]

The different types of media, depending on whether they have the disk 91 or IC memory 92, can be used in diversified modes, taking advantage of the disk 91 or IC memory 92.

Also, depending on whether the media have only ROM area, only rewritable area, or both a ROM area and a rewritable area, use modes appropriate for the respective characteristics are possible.

Particularly, disk media M13, IC media M23, and hybrid media M32, M33, M34, M36, M37, M38, and M39, which have both a ROM area and a rewritable area, are used in diversified modes.

For example, for some of hybrid media, examples of appropriate use modes will be described.

Hybrid media (M34, M36, M37, M38, M39) containing the disk 91 having a rewritable area and the IC memory 92 having a ROM area i) Browser software and push-type software are placed in a ROM area of the IC memory 92 and a rewritable area of the disk 91 is used to cache read data.

ii) Automatically browsed software is placed in a ROM area of the IC memory and file data is cached in a rewritable area of the disk 91 so that it can be browsed at user's leisure.

iii) The addresses from which to download software or the like and applications or the like to be downloaded are placed in a ROM area of the IC memory 92 so that the software or the like can be downloaded to a rewritable area of the disk 91 from a network for use.

iv) Store numbers and specific IDs are placed in a ROM area of the IC memory 92 as media for POS terminals and file data such as receipts is stored in a rewritable area of the disk 91.

Hybrid media (M33, M39) provided with the disk 91 having a ROM area and the IC memory 92 as ROM/RAM-IC i) Software is placed in a ROM area of the disk 91 and installers and specific IDs are placed in a ROM area of the IC memory 92. Furthermore, a install history is written to a RAM area of the IC memory 92. Thus, software media resistive to unauthorized duplication are realized.

Hybrid media (M32, M33, M38, M39) provided with the disk 91 having a ROM area and the IC memory 92 having a RAM area i) Data such as maps and existing URLs is placed in a ROM area of the disk 91, and additional information such as memo data and new URLs is written to a RAM area of the IC memory 92.

ii) Game software is placed in a ROM area of the disk 91 and midway progress information and final result information are stored in a RAM area of the IC memory 92.

These are only several examples and the media M11 to M39 can be used in diversified modes in accordance with the respective characteristics.

As described above, each of the media has the above characteristics in terms of mass storage, fast write/read, compatibility with conventional disk drive units, ease of manufacturing, and diversity of use method. Use methods appropriate for the media can be selected or created taking individual advantages into consideration, and conversely, media can be selected to meet use purposes.

6. Configuration of Drive Unit

Hereinafter, a description will be made of the configuration of a drive unit supporting the above media M11 to M39.

Figure 11:
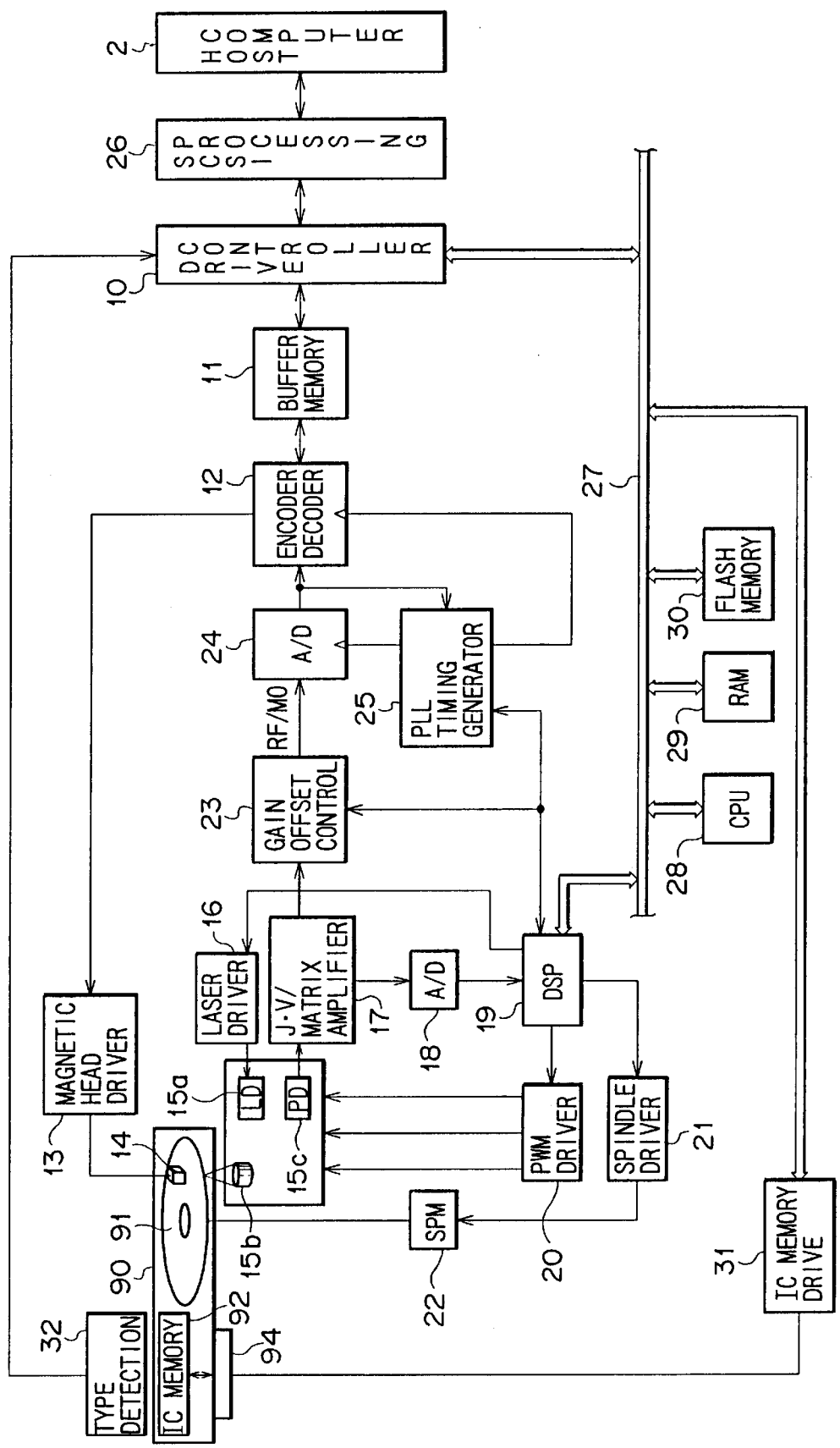
FIG. 11 is a block diagram for a drive unit embodied by the present invention.

FIG. 11 is a block diagram of a drive unit 1 of this example.

The drive unit 1 is normally connected to a host computer 2 and performs recording and reproduction operations under the management and control of the host computer 2.

For example, the drive unit 1, connected to the host computer 2 through SCSI (small computer system interface), exchanges commands and data with the host computer 2 (e.g., a personal computer) and performs recording and reproduction operations on media in accordance with read/write requests from the host computer 2. For example, for a read command from the host computer 2, the drive unit reads data from mounted media and supplies it to the host computer 2.

Herein, the mounted media may be disk media, IC media, or hybrid media described above.

A drive controller 10 (hereinafter referred to as a controller) performs communications with the host computer 2 and controls the whole of recording and reproduction operations of the drive unit 1.

When mounted media are disk media or hybrid media and recording/reproduction is performed on the disk 91, the drive controller 10 drives a communication-enabled DSP 19 (digital signal processor) for actual recording or reproduction through a bus 27. The DSP 19, having a function of a so-called servo driver, supplies a spindle drive control signal to a spindle driver 21 in accordance with serve information supplied from an A/D converter 18 and applies a drive signal to a spindle motor 22, and thereby drives the disk 91 with CAV.

To allow a laser diode 15a in an optical head 15 to emit a laser light, a drive control signal is output to a laser driver 16 to control laser emission. The laser light from the laser diode 15a passes through an optical system not shown and is irradiated to the disk 91 via an objective lens 15b. A reflected light from the disk 91 is irradiated to a photo detector 15c via the optical system not shown and is taken out as an electrical signal.

An electrical signal obtained in the photo detector 15c is supplied to an J-V/matrix amplifier 17, and after being subjected to current-voltage transformation, various signals are taken out by the matrix operation amplifier. That is, an RF signal to be used as reproduction data is taken out from a ROM area AE of the disk 91, and an MO signal, focus error signal, tracking error signal, front APC signal, and the like to be used as reproduction data are taken out from a rewritable area ARW of the disk 91.

The focus error signal, tracking signal, and front APC signal, which serve as servo information, are transformed into digital data by an A/D converter 18, and are supplied to the DSP 19.

The DSP 19 generates a servo drive signal in accordance with the focus error signal and tracking error signal, and supplies it to a PWM driver 20. The PWM driver 20 supplies drive power to a focus coil, galvanomotor and slide motor.

That is, the PWM driver 20 applies drive power to the focus coil by a focus servo drive signal based on a focus error signal, whereby focus control is performed such that the objective lens is driven in a direction that places it into contact with the disk, and the PWM driver 20 applies drive power to the galvanomotor and slide motor by the tracking servo drive signal and slide servo drive signal based on the tracking error signal, whereby tracking control and sled transfer control are performed.

The DSP 19 controls the laser driver 16 in accordance with a front APC signal so as to keep laser output at the proper level.

Data read from the disk 91 during reproduction is obtained as an RF signal or MO signal from the J-V/matrix amplifier 17. An output from the J-V/matrix amplifier 17 is set at the proper potential level in a gain/offset control part 23 and is converted into digital data in an A/D converter 24.

The signal converted into digital data is supplied to an encoder/decoder part 12 and is subjected to digital filter processing, Viterbi decoding processing, NRZ decoding processing, descramble processing, and other processing, thus output as reproduction data.

After being stored in a buffer memory 11, the reproduction data is sent to an SCSI processing part 26 by the controller 10 at a predetermined timing and is transferred to the host computer 2.

The output of the A/D converter 24 is supplied to the PLL timing generator 25 to generate a reproduction clock for reproduction processing and a variety of timing signals synchronous to a reproduction signal so that the reproduction clock and a variety of timing signals based on the reproduction clock are formed by so-called PLL operations.

When a recording request command and data to be recorded are supplied from the host computer 2 via the SCSI processing part 26 and the recording operation is performed for the disk 91, the controller 10 stores the data in the buffer memory 11, and then supplies it to the encoder/decoder part 12 at a predetermined transfer rate, where it is encoded in a format in which the data is actually recorded on the disk 91. The encoded data is supplied to a magnetic head driver 13, which performs field application operations on the disk 91 from the magnetic head 14 in accordance with the data to be recorded.

During recording, high-level laser output for recording is performed at the laser diode 15a.

As described above, media having the IC memory 92 may be mounted as IC media or hybrid media. In this case, the controller 10 controls recording/reproducing operations on the IC memory 92.

An IC memory drive 31 is connected to the bus 27, and the controller 10 executes access to the IC memory 92 by controlling the operation of the IC memory drive 31.

The IC memory drive 31 is connected with the IC memory 92 via a contact 94 on the cartridge 90.

When data is reproduced from the IC memory 92 for a read request from the host computer 2, the controller 10 directs the IC memory drive 31 to make read access to read data into the buffer memory 11. The read data is transferred from the SCSI processing part 26 to the host computer 2.

When data is recorded in the IC memory 92 for a write request from the host computer 2, the controller 10 supplies write data to the IC memory drive 31 and directs it to make write access.

CPU 28, RAM 29, and flash memory 30 are connected to the bus 27 of the drive unit 1.

For example, even when there is no request from the host computer 2, the CPU 28 executes access to the IC memory 92 as required, whereby read data can be got into the RAM 29.

Processing coefficients required for various control operations and information for file management might be recorded in the flash memory 30.

As described above, when media are mounted, the drive unit 1 must identify the media to determine a control method for the media. This is achieved by performing identification processing of identification methods described with reference to FIGS. 8 to 10 described above.

For this reason, an optical or mechanical switch-like type detection part 32 is provided so that the controller 10 gets the sense information.

The sense information refers to information (detection information obtained in detection holes 96 and 98, and WP switches 95 and 97) about the existence or absence of a hole in a predetermined position, as described in ① to ⑧ above.

7. Operation of Drive Unit

Figure 12:
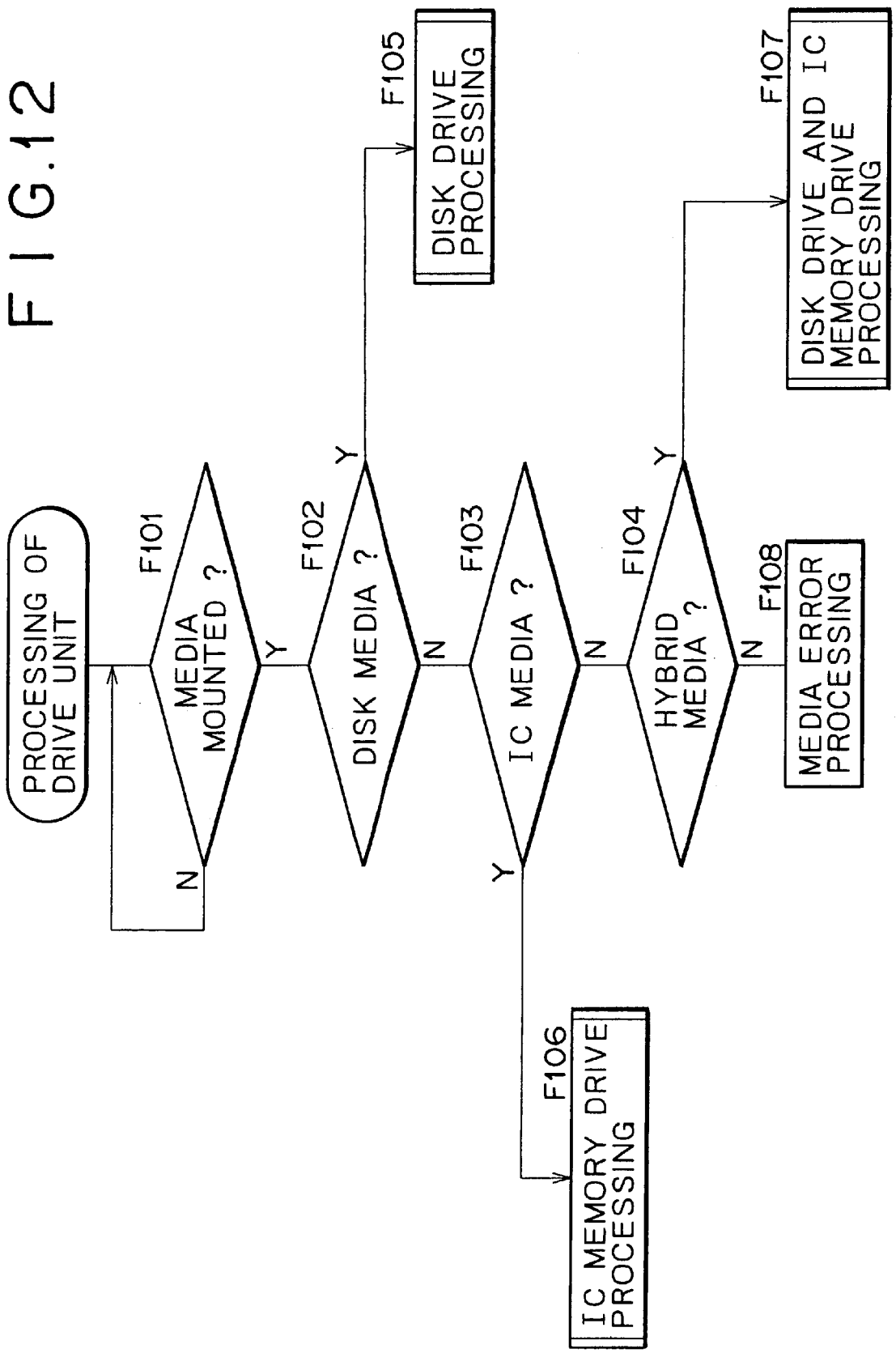
FIG. 12 is a flowchart for processing of a drive unit embodied by the present invention.

When media are mounted, the operation of the drive unit 1 (processing of the controller 10) is performed as shown in FIG. 12.

When the media cartridge 90 is mounted, the drive unit transfers processing from step F101 to media identification processing comprising steps F101, F102, F103, and F104.

That is, with sense information got from the type detection part 32, when the media apply to the case of ① or ② of the identification methods described above, it is determined that the mounted media are disk media.

In this case, the drive unit proceeds to step F105 to perform disk drive processing for the media, and then performs a recording or reproduction operation in accordance with directions from the computer 2. When the media apply to the case of ①, only reproduction operation is performed.

When the sense information from the type detection part 32 tells that the media apply to the case of ③ or ④ of the identification methods described above, it is determined that the mounted media are IC media.

In this step, the drive unit 1 proceeds to step F106 to perform internal settings for IC memory drive processing for the media, and then performs a recording or reproduction operation in accordance with directions from the host computer 2. When the media apply to the case of ③, only reproduction operation is performed.

When the sense information from the type detection part 32 tells that the media apply to one of the cases of ⑤ to ⑧ of the identification methods described above, it is determined that the mounted media are hybrid media.

In this case, the drive unit 1 proceeds to step F107 to perform internal settings so that disk drive processing and IC memory drive processing are performed as required, for the media, and then performs a recording or reproduction operation on the disk 91 or IC memory 92 in accordance with directions from the host computer 2. When the media apply to the case of ⑤ or ⑦, only reproduction operation is performed on the disk 91. When the media apply to the case of ⑤ or ⑥, only reproduction operation is performed on the IC memory 92.

If the media do not apply to any of the cases of ① to ⑧ above, the drive unit 1 determines that the media are inappropriate, and proceeds to step F108 to perform error processing.

By performing operation settings as shown in FIG. 12, recording or reproduction operations are performed approximately for different types of media.

The handling of logical drives is briefly described.

For SCSI as in this example, to switch access from the host computer 2, assign one SCSI-ID to the drive unit 1 and assign different LUN numbers to a disk drive and an IC memory drive.

For SCSI as in this example, to switch access from the host computer 2, assign different slot numbers to a disk drive and an IC memory drive from a master or slave.

For IDE1394, use LUN numbers. For other interfaces, use LUN numbers if they can be selected; otherwise, change ID numbers for access.

8. Media in Which Key Data is Recorded

For the different types of media having been described above, media distributors might record key data within the media and allocate a protection area corresponding to the key data so that data (file, application, etc.) recorded in the protection area corresponding to the key data cannot be used unless matching based on the key data recorded in the media is OK in the user side.

Additionally, a user might record key data for owned media and allocate a protection area corresponding to the key data so that data (file, application, etc.) recorded in the protection area corresponding to the key data cannot be used (namely, cannot be used without permission by others) unless matching based on the key data recorded in the media is OK.

Hereinafter, media in which key data is recorded will be described using an example that media distributors (software producers, etc.) perform key data settings.

Figure 13:
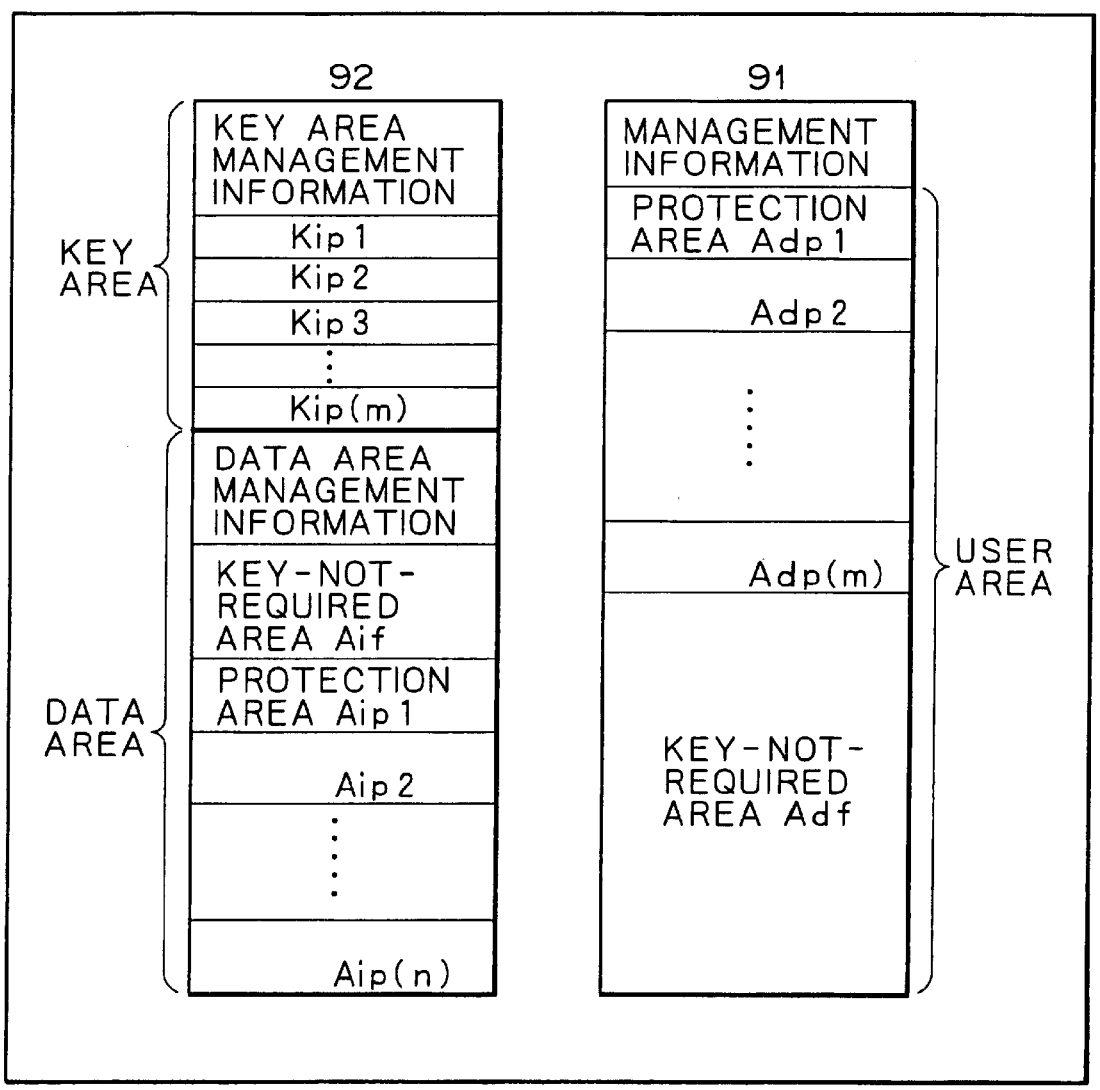
FIG. 13 is a diagram for explaining hybrid media, embodied by the present invention, in which key data is recorded.

Although the types (M11 to M39) of media are not limited, an example that key data is recorded in hybrid media is shown in FIG. 13.

For example, a key area is allocated within the IC memory 92 and key area management information and one or more pieces of key data are recorded in the key area. In this case, a plurality of pieces of key data Kip1 to Kdp(m) are recorded.

Information necessary for use of key data such as the number of pieces of recorded key data and pointers to recording positions (addresses) is recorded as key area management information.

Within the IC memory 92, a data area, in addition to the key area, is allocated. In the data area, not only data area management information is recorded, but also a key-not-required area Aif in which actual data files and applications are recorded, and protection areas Aip1 to Aip(n) are allocated.

Such area setting information and data contents recorded in each area are recorded as data area management information.

In the disk 91, a key-not-required area Adf in which actual data files and applications are recorded, and protection areas Adp1 to Adp(m) are allocated in other than management information areas (control zones, etc. in FIG. 3), that is, a user area.

In this case, the protection areas Aip1 to Aip(n) and Adp1 to Adp(m) are provided with corresponding key data Kip1 to Kdp(m), respectively.

In these media, the key-not-required areas Aif and Adf are permitted for recording and reproduction without special limitations being imposed on users.

On the other hand, for the protection areas Aip1 to Aip(n) and Adp1 to Adp(m), reading of data files recorded therein and data writing to the protection areas are not permitted unless matching based on key data corresponding to each protection area is OK.

To be more specific, in the key-not-required areas Aif and Adf, for example, the first data required for media use (setup data, guide data, demonstration versions of pay applications, etc.), free applications, and the like are recorded.

In the protection areas, applications and data files available to only users satisfying specific conditions (users who paid charges) are recorded.

A user satisfying specific conditions on the use of data in a protection area is assigned a code number for matching with key data corresponding to the protection area.

If the user correctly enters the code number when using the media, matching with the key data becomes OK and the user can read data from the protection area and write data to the protection area.

Various methods are available to allocate key data and protection areas. For example, the whole of real data recording areas within media might be defined as a protection area so that one piece of key data is allocated to the whole. That is, matching is performed based on key data when the media are mounted, and if the matching is not OK, the media cannot be used.

A key area might be allocated not within the IC memory 92, but in the disk 91, and protection areas might be allocated in either of the IC memory 92 and the disk 91.

For example, with an area of the disk 91 defined as a protection area, key data and required management information could be stored in the IC memory 92.

Key data can be recorded in a ROM area to prevent it from being rewritten without permission, but for purposes of use or for other reasons, it may be more convenient that key data is rewritable, in which case the key data might be recorded in a rewritable area (RAM area).

9. Drive Operations on Media in Which Key Data is Recorded

Referring to FIGS. 14 and 15, a description is made of processing of the drive unit 1 and host computer 2 when media in which key data is set is mounted.

Herein, a description is made of a processing example that, on the assumption that key data is set only in hybrid media, matching with the key data is performed when the hybrid media are mounted.

The controller 10 of the drive unit 1, when media are mounted, identifies the type of the media in steps F202, F203, and F204, beginning from step F201. The controller performs disk drive processing in step F205 in the case of disk media and IC memory drive processing in step F206 in the case of IC media, and for inappropriate media, performs media error processing in step F208. This processing is the same as that in the above described steps F101 to F106, and F108 of FIG. 12.

When the media are hybrid media, the controller proceeds from step F204 to F207 to determine whether the media are ones in which data is recorded in a protection area, that is, whether key data exists. For example, this is determined by actually reading management information from the IC memory 92.

For media in which no key data and protection area are set, the controller proceeds to step F212 to perform operation settings so that both the disk drive and IC memory drive are executed as required.

For media in which key data and protection area are set, the controller, in step F209, waits for key entry, that is, the entry of a code number for key data matching.

The user enters a code number as described later in FIG. 15, in accordance with processing of the host computer 2. Upon receipt of the entered code number, the controller performs matching processing in step F210.

The controller analyzes the key data read from the media and the entered code number and compares them to determine whether an appropriate code number is entered.

If an appropriate code number is entered, the controller proceeds to step F212 and performs operation settings so that both the disk drive and IC memory drive are executed as required.

On the other hand, if an appropriate code number is not entered, the controller performs error processing in step F213 and terminates. That is, the controller determines that the user cannot use the media.

During this processing, the host computer 2 performs processing, as shown in FIG. 15.

That is, when media are mounted in the drive unit 1, the media type and the existence of key data setting are judged in the above described processing of FIG. 14, while the host computer 2 proceeds from step F301 to F302 and waits for the result of the identification.

If the identification result indicating that the mounted media are the media in which no key data is set is obtained from the drive unit 1, the host computer 2 proceeds from step F302 to F303 to perform normal processing.

If the mounted media are the media in which key data is set, the host computer 2 proceeds from F302 to F304 to determine whether key input software exists in the system. If it does not exist, since input corresponding to the setting of key data, that is, input of a code number by the user cannot be made, processing terminates in step F305. That is, the user cannot use the media.

On the other, if key input software exists, the host computer 2, in step F306, determines whether the key input software is recorded in the media, or whether the host computer 2 itself has it as a result of install processing at an earlier point.

If the software has been installed in the host computer 2, the host computer 2 proceeds to step F307 to start the key input software.

If the key input software is recorded in the media, the host computer 2, in step F308, reads the key input software from the media via the drive unit 1 and starts it.

If the key input software is started, the user enters a code number in accordance with processing by the software. The host computer 2, in step F309, waits for a code number from the user, and if it has been input, transfers the code number to the drive unit 1 in step F310.

As a result of the transfer, matching processing in step F210 of FIG. 14 is performed and a identification result is obtained in step F211.

The host computer 2 monitors the identification result in step F311, and if an appropriate code number is entered and the matching is OK, proceeds to step F312 to perform normal processing, that is, to enable drive processing for the media. If the matching is N.G., the host computer 2 performs termination processing in step F313. That is, the user cannot use the media.

The above described processing in FIGS. 14 and 15 will help ensure that media in which key data is set can be used by only users who know correct code numbers.

Accordingly, for example, presenting code numbers (secret numbers) to only who legally purchased the media contributes to preventing the media from being illegally used by unauthorized persons.

This processing example judges whether to permit or reject the use of media when mounted. However, as another example, with transfer to the normal processing mode instead of performing such processing when media are mounted, drive processing might be enabled for the media in some portions.

For each of data files and applications recorded in the media, such judgement of permission or rejection might be made when they are used.

For example, when key data and protection areas are allocated as shown in FIG. 13, the key-not-required areas Aif and Adf can be freely used also by users not presented with code numbers.

Accordingly, permission or rejection might be judged in such a way that, with access to these key-not-required areas Aif and Adf at users' disposal, only when users request use of files or applications recorded in a certain protection area, processing in and after step F207 of FIG. 14 and processing in and after step F304 of FIG. 15 are performed.

The above described allocation of key data and protection areas in media will contribute to improvement in security at the user side and provide diversified media distribution modes.

For example, in a media distribution mode, media are sold to users in a form that records respectively different applications in a plurality of protection areas. Users specify their desired application of them and pay a charge, and get key data (code number) corresponding to the application from a sales shop, a service center of the manufacturer, or the like.

The users can use their desired applications by simply paying charges corresponding to the applications.

Since manufacturers, without the need to manufacture different media for each application, manufacture and sell media having identical contents in which a plurality of applications are recorded, the efficiency of manufacturing media will be significantly improved.

Also, when users want to use other applications at a later time, they do not take the trouble to newly purchase media and have only to get key data (code number) by paying charges corresponding to the applications.

For example, in this way, efficient distribution modes can be achieved for software products such as applications and data files.

In the key-not-required areas Aif and Adf might be recorded free software products and setup systems required to use them, and also demonstration programs for introducing applications recorded in protection areas of the media.

Data in protection areas on media might not be read unless key data matching is OK, by defining management information so that the protection areas cannot be accessed. Alternatively, data recorded in the protection areas might be recorded in cipher.

In other words, although the data can be read, it cannot be actually used without decryption software.

The decryption software is also recorded in a protection area, and if key data matching is OK, data recorded in the protection area can be used using the decryption software.

As described above, key data and protection areas might be allocated not only by the manufacturer side but also the user side. That is, when user-created file data and the like are saved in a rewritable area (RAM area) of media, the area is defined as a protection area and corresponding key data is set and recorded in the media.

By doing so, the data in the protection area can be hidden from others.

Although the processing example in FIGS. 14 and 15 has been described on the assumption that media in which key data is set are only hybrid media, of course, key data can be set also in disk media and IC media, in which case it goes without saying that key data matching should be performed when the media are mounted.

Although preferred embodiments of the present invention have been described, it goes without saying that many diversified examples are possible with the present invention, without being limited to the above described drive unit configurations, media configuration, media data configuration, and processing methods.

As has been described above, the present invention defines the shapes of cartridges so that the recording media mounting part of a drive unit can be shared between one of a plurality of types of recording media and others of them. That is, a plurality of types of recording media according to the present invention are respectively almost the same in cartridge shape and any of them can be mounted in the recording media mounting part of a drive unit for recording or reproduction operations.

The plurality of types of recording media, for example, include recording media (disk media) with disk-shape recording media housed within a cartridge, recording media (IC media) with IC memory housed within a cartridge, and recording media (hybrid media) with disk-shape recording media and IC memory housed within a cartridge.

These facts allow users to use specific types of recording media optionally and selectively in accordance with their convenience and use purposes, media prices, and media characteristics, enabling flexible information processing tasks.

Use of disk media would provide the advantage of mass storage and use of IC media would provide the advantage of fast recording and reproduction. Use of hybrid media would provide diversified information distribution modes and use modes, taking advantage of characteristics of the hybrid media (on the part of media manufacturers, diversified information distribution modes and sales modes can be achieved), as well as the respective advantages of mass storage by disk and fast recording and reproduction by IC memory.

As hybrid disks, media having functions similar to P-ROM disks can be manufactured inexpensively with a high yield rate.

Recording media of the present invention have an identification feature for providing identification of the media type, formed on a cartridge.

A drive unit that can perform recording or reproduction operations on a plurality of types of these recording media has identification means for identifying the type of the recording media in accordance with an identification feature formed on the cartridge of recording media mounted in a recording media mounting part, and in accordance with the type of recording media identified by the identification means, performs a recording or reproduction operation on the mounted recording media by either or both of disk drive means and IC memory drive means.

Accordingly, when recording media corresponding to the above described plurality of recording media are mounted, appropriate recording and reproduction operations are performed in accordance with the recording media and users do not need to provide a plurality of drive units to use different types of recording media. In other words, a plurality of recording media can be used without increasing the load on users.

As recording media of the present invention, in part or the whole of an area, of the recording media, in or from which data can be recorded or reproduced, one or more data protection areas are allocated and one or more pieces of key data corresponding to the data protection areas are recorded. A drive unit according to the present invention comprises: key data existence judgement means for judging whether key data is recorded in mounted recording media; and drive permission means for matching the key data with input data when it is determined by the key data existence judgement means that the mounted media are recording media in which key data is recorded, and when the matching yields a successful result, for permitting a recording or reproduction operation on a data protection area on the recording media, corresponding to the key data.

By this construction, data protection areas in or from which data can be recorded or reproduced only when matching by use of key data is OK can be allocated, thereby promoting diversified use modes, media/data distribution modes, and sales modes, and also enabling addition of a security function.

If program data (application) for key data matching is recorded in recording media, there is no need for users to provide the program apart from the media.

What is claimed is:

1. Recording media comprising:
   a first cartridge having a mounting part mounted in a drive unit;
   a first recording media housed in the first cartridge, first recording media having a first recording reproduction speed;
   a second cartridge having a shape similar to a shape of the first cartridge and having a mounting part mounted in the drive unit; and
   a second recording media housed in the second cartridge, the second recording media having a second recording reproduction speed,
   wherein the respective mounting parts of the first and second cartridges are adapted to be mounted in a common drive unit,
   wherein the first recording media and the second recording media each include an operative area adapted to aid in at least one of recording and reproducing data, wherein each operative area defines at least one data protection area and includes at least one piece of key data, and
   wherein at least one operative area includes program data to perform matching by use of the at least one key data.

2. Recording media comprising:
   a cartridge having a mounting part mounted in a drive unit and defining a front portion and a back portion;
   a first recording medium having a first recording/reproduction speed; and
   a second recording medium having a second recording/reproduction speed,
   wherein the cartridge contains at least one of the first and second recording medium as a contained recording medium and includes an identification feature having means for identifying through at least one hole in the back portion of the cartridge both (i) between a disk media type, an IC media type, and a hybrid media type of the contained recording medium, and (ii) between a reproduction only memory status and a write-enabled memory status of the contained recording medium.

3. Recording media according to claim 2, wherein the first recording media is disk-shape recording media.

4. Recording media according to claim 2, wherein the second recording media is integrated circuit (IC) memory.

5. Recording media according to claim 2, wherein the first recording media and the second recording media each include an operative area adapted to aid in at least one of recording and reproducing data, wherein each operative area defines at least one data protection area and includes at least one piece of key data.

6. A drive unit to perform recording and reproduction operations on a plurality of types of recording media, each recording media having a cartridge as a housing, the cartridge having a front portion and a back portion, the drive unit comprising:
   a recording media mounting part adapted to receive as mounted the plurality of types of recording media;
   an identifier which identifies through at least one hole in the back portion of the cartridge both (i) between a disk media type, an IC media type, and a hybrid media type of the recording media, and (ii) between a reproduction only memory status and a write-enabled memory status of the recording media;
   disk drive means for at least one of recording and reproducing data disposed on a disk-shape recording media;
   integrated circuit (IC) memory drive means for at least one of recording and reproducing data disposed in an IC memory; and
   means for controlling the execution of at least one of a recording and reproduction operation on a mounted recording media by at least one of the disk drive means and the IC memory drive means, wherein the means for controlling is adapted to operate as a function of the type of recording media identified by the identifier.

7. The drive unit according to claim 6, further comprising:
   key data existence judgement means for judging whether key data is recorded in mounted recording media; and
   drive permission means for matching the key data with input data when it is determined by said key data existence judgement means that the mounted media are recording media in which key data is recorded, and when the matching yields a successful result, for permitting a recording or reproduction operation on a data protection area on the recording media, corresponding to the key data.

8. The recording media of claim 2, wherein
   if the at least one hole is disposed in a first area of the back portion of the cartridge, the means for identifying is adapted to convey an identity type of one of the disk media type and the IC media type and,
   if the at least one hole is disposed in a second area of the back portion of the cartridge, the means for identifying is adapted to convey an identity type the other of the disk media type and the IC media type.

9. The recording media of claim 8, wherein the at least one hole includes a switch,
   wherein the stitch has a first position at which the means for identifying is adapted to convey a status of the reproduction only memory status and
   wherein the stitch has a second position at which the means for identifying is adapted to convey a status of the write-enabled memory status.

10. The recording media of claim 2, wherein the means for identifying includes at least a first hole disposed in a first area of the back portion and a second hole disposed in a second area of the back portion such that the means for identifying is adapted to convey an identity type of the hybrid media type.

11. The recording media of claim 10, wherein at least one of the first hole and the second hole includes a switch, wherein the stitch has a first position at which the means for identifying is adapted to convey a status of the reproduction only memory status and wherein the stitch has a second position at which the means for identifying is adapted to convey a status of the write-enabled memory status.

12. The recording media of claim 6, wherein if the at least one hole is disposed in a first area of the back portion of the cartridge, the means for identifying is adapted to convey an identity type of one of the disk media type and the IC media type and, if the at least one hole is disposed in a second area of the back portion of the cartridge, the means for identifying is adapted to convey an identity type the other of the disk media type and the IC media type.

13. The recording media of claim 12, wherein the at least one hole includes a switch, wherein the stitch has a first position at which the means for identifying is adapted to convey a status of the reproduction only memory status and wherein the stitch has a second position at which the means for identifying is adapted to convey a status of the write-enabled memory status.

14. The recording media of claim 6, wherein the means for identifying includes at least a first hole disposed in a first area of the back portion and a second hole disposed in a second area of the back portion such that the means for identifying is adapted to convey an identity type of the hybrid media type.

15. The recording media of claim 14, wherein at least one of the first hole and the second hole includes a switch, wherein the stitch has a first position at which the means for identifying is adapted to convey a status of the reproduction only memory status and wherein the stitch has a second position at which the means for identifying is adapted to convey a status of the write-enabled memory status.

* * * * *